United States Patent [19]

Kawai

[11] Patent Number: 4,734,655
[45] Date of Patent: Mar. 29, 1988

[54] DIGITAL ROTATION DETECTING APPARATUS

[75] Inventor: Jyoji Kawai, Kobe, Japan

[73] Assignee: Mitsubishi Denki Kabushiki Kaisha, Tokyo, Japan

[21] Appl. No.: 903,296

[22] Filed: Sep. 3, 1986

[30] Foreign Application Priority Data

Oct. 4, 1985 [JP] Japan .................................. 60-222256

[51] Int. Cl.$^4$ ............................ H03L 7/06; H02P 5/00
[52] U.S. Cl. ...................................... 331/25; 331/65; 318/314
[58] Field of Search .................... 331/1 R, 18, 25, 65; 318/314, 318

[56] References Cited

U.S. PATENT DOCUMENTS 3,564,368 2/1971 Kelling .................................. 318/314
3,828,234 8/1974 Goldberg ............................. 318/314
4,072,884 2/1978 Treadwell ............................ 318/314

OTHER PUBLICATIONS

*The Digital Rotation Detection Apparatus Using Resolve,* 546 National Convention of Japanese Institute of Electrical Engineers.

Primary Examiner—Eugene R. LaRoche
Assistant Examiner—David Mis
Attorney, Agent, or Firm—Burns, Doane, Swecker & Mathis

[57] ABSTRACT

A digital rotation detecting apparatus of the invention, which is adapted to detect a phase angle $\theta_r$ of a resolver by using a multiple frequency clock of the excitation frequency for the resolver and a clock of a voltage control oscillator, is detectable of an instantaneous value of the phase angle $\theta_r$ at a desired time without delay, is also detectable directly of the rotational speed, and requires no low frequency excitation because the excitation frequency for the resolver needs only to be constant.

6 Claims, 7 Drawing Figures

DIGITAL ROTATION DETECTING APPARATUS

BACKGROUND OF THE INVENTION

1. Field of the Invention

This invention relates to a digital rotation detecting apparatus for detecting a rotation angle and the rotational speed of a rotation body such as a motor.

2. Description of the Prior Art

FIG. 1 is a block diagram of the conventional digital rotation detecting apparatus disclosed in the 546 National Convention of Japanese Institute of Electric Engineers in 1982. In FIG. 1, reference numeral 1 designates a two-phase resolver which rotates in association with a rotary body, such as a motor, 2 designates a reference oscillator circuit of the fixed frequency having a two-phase output, 3 designates a phase difference detector for detecting a phase difference between the two-phase output of the reference oscillator circuit 2 and that of the two-phase resolver 1, 4 designates a loop filter for proportional-plus-integral-computing the aforesaid phase difference, 5 designates a voltage control oscillator (to be called the VCO hereinafter) for generating pulses of the frequency corresponding to the output of the loop filter 4, 6 designates a counter which counts the output pulse of the VCO 5, 7 designates an exciter which generates the two-phase sine-wave output of the phase value corresponding to the counted value by the counter 6 so as to excite the two-phase resolver 1, and 8 designates a latch circuit for latching the counted value by the counter 6 by means of the pulse generated by the reference oscillator circuit 2.

Next, explanation will be given on operation of the aforesaid conventional apparatus. At first, when a phase angle of the two-phase resolver 1 is represented by $\theta_r$ and an excitation phase of the exciter 7 by $\theta_o$, the two-phase resolver 1 generates the two-phase sine wave of phase angle $(\theta_o - \theta_r)$, at which time when the phase of two-phase output of the reference oscillator circuit 2 is represented by $\theta^*$, an output $\Delta\theta$ of the phase difference detector 3 is given in the following equation:

$$\Delta\theta = \theta^* - (\theta_o - \theta_r) \quad (1),$$

where since the portion surrounded with the broken line 10 in FIG. 1 constitutes a closed loop of phase synchronization generally called the PLL (Phase Locked Loop), automatic control is carried out to obtain $\Delta\theta = 0$. Hence, the following equation (2) is derived from the equation (1):

$$\theta^* = \theta_o - \theta_r \quad (2).$$

In the equation (2), when $\theta^* = 0$, $\theta_o = \theta_r$ is obtained, in other words, when the value of $\theta_o$ is sampled at the time of $\theta^* = 0$, the samples value indicates $\theta_r$. Also, since the counted value by the counter 6 is proportional to the excitation phase $\theta_o$, when the latch circuit 8 latches the counted value by the counter 6 at the timing of outputting the pulse by the reference oscillator circuit 2 at every cycle of $\theta^* = 0$ thereof, the phase angle $\theta_r$ of the two-phase resolver 1 at the time of $\theta^* = 0$ is to be detected. When a difference $\theta_r(\text{NEW}) - \theta_r(\text{OLD})$ between the phase angles $\theta_r$ twice sampled is divided by a cycle period $T^*$ of the phase $\theta^*$, the rotational speed is given in the following equation:

$$\omega r = \frac{\theta_r(\text{NEW}) - \theta_r(\text{OLD})}{T^*} \quad (3)$$

The conventional digital rotation detecting apparatus constructed as the above-mentioned samples the phase angle $\theta_r$ at the time when the phase of the two-phase output of the reference oscillator circuit is zero, that is, when $\theta^* = 0$, whereby $\theta_r$ at a desired time cannot be obtained, and a detection delay of $T^*$ at a maximum is created. For a rotation control apparatus for a motor using a microcomputer, the timing of introducing into the control apparatus the detected phase angle $\theta_r$ and the cycle period thereof are often not-identical with the timing of $\theta^* = 0$ or the cycle period of $\theta^*$. Therefore, the detection delay is also created to enlarge a detection error in the last phase angle $\theta_r$. As a result, the problem has been created in that the speed computation executed by the microcomputer and given in the equation (3) of course causes the error.

In order to improve the detection accuracy for the phase angle $\theta_r$, the maximum counted value by the counter 6 need only be larger, but it is required therefor either to raise the oscillation frequency of the VCO 5, or to lower the reference oscillation frequency $f^*$, or to perform both the processings. The maximum oscillation frequency of VCO 5, however, has the upper limit, so that it is necessary to lower the reference oscillation frequency $f^*$ to obtain a high accuracy for detecting the phase angle $\theta_r$.

Now, the two-phase resolver 1 is excited with the frequency of $f_o = f^* + f_r$, but when the resolver 1 reversely rotates, the frequency becomes $f_o = f^* - |f_r|$. Accordingly, the excitation frequency $f_o$ approaches zero as the reference oscillation frequency $f^*$ is reduced to approach $|f_r|$, thereby creating the problem in that the resolver 1 must be considered to be low-frequency-excited and the exciter 7 also must take a large current capacity.

SUMMARY OF THE INVENTION

In the light of the above problems, the present invention has been designed.

A first object of the present invention is to provide a digital rotation detecting apparatus which is obtainable of a phase angle at a desired time.

A second object of the present invention is to provide a digital rotation detecting apparatus which is capable of eliminating a detection delay.

A third object of the present invention is to provide a digital rotation detecting apparatus which can improve the accuracy for detecting the phase angle $\theta_r$ while keeping constant the excitation frequency of a resolver without using the low frequency as the excitation frequency of the resolver, in other words, without the need to excite the resolver by the low frequency.

The digital rotation detecting apparatus of the invention uses a PLL circuit which excites the resolver at the fixed frequency and introduces the resolver output, so that clock pulses of the VCO in the PLL circuit and those of the double frequency actuate an up-down counter, thereby detecting an instantaneous value of the phase angle of the resolver.

Also, the digital rotation detecting apparatus of the invention uses the double frequency clock pulses of the excitation frequency and the clock pulses of VCO to thereby detect the phase angle $\theta_r$.

The above and further objects and features of the invention will more fully be apparent from the following detailed description with accompanying drawings.

DESCRIPTION OF THE PREFERRED EMBODIMENTS

Next, explanation will be given on an embodiment of the digital rotation detecting apparatus of the invention.

Figure 2:
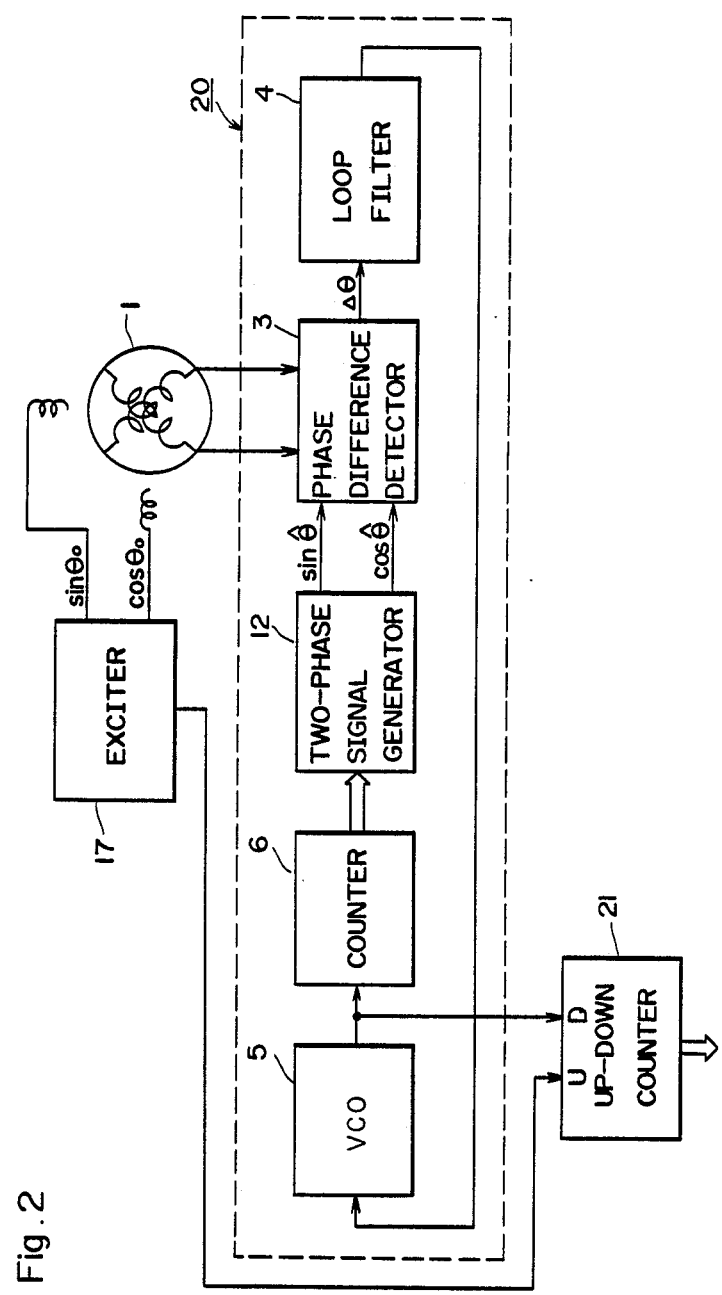
FIGS. 2 through 7 are block diagrams of the embodiments of a digital rotation detecting apparatus of the invention respectively.

FIG. 2 is a block diagram of a first embodiment of the digital rotation detecting apparatus of the invention, in which reference numeral 1 designates a two-phase resolver which rotates in association with a rotary body, such as a motor, 3 designates a phase difference detector for detecting a phase difference between a two-phase output of a two-phase signal generator 12 described later and that of the two-phase resolver 1, 4 designates a loop filter for proportional-plus-integral-computing the phase difference, 5 designates a voltage control oscillator (to be called VCO hereinafter) for generating pulses of the frequency corresponding to an output of the loop filter 4, 6 designates a counter for counting the output pulse from the VCO 5, 12 designates a two-phase signal generator which generates a two-phase AC signal of the phase corresponding to the counted value by the counter 6 as a second counter means, 17 designates an exciter for exciting the resolver 1, and 21 designates an up-down counter as a first counting means which increases or decreases the counted values by the pulse given from the exciter 17 and the output pulse from the VCO 5.

Figure 1:
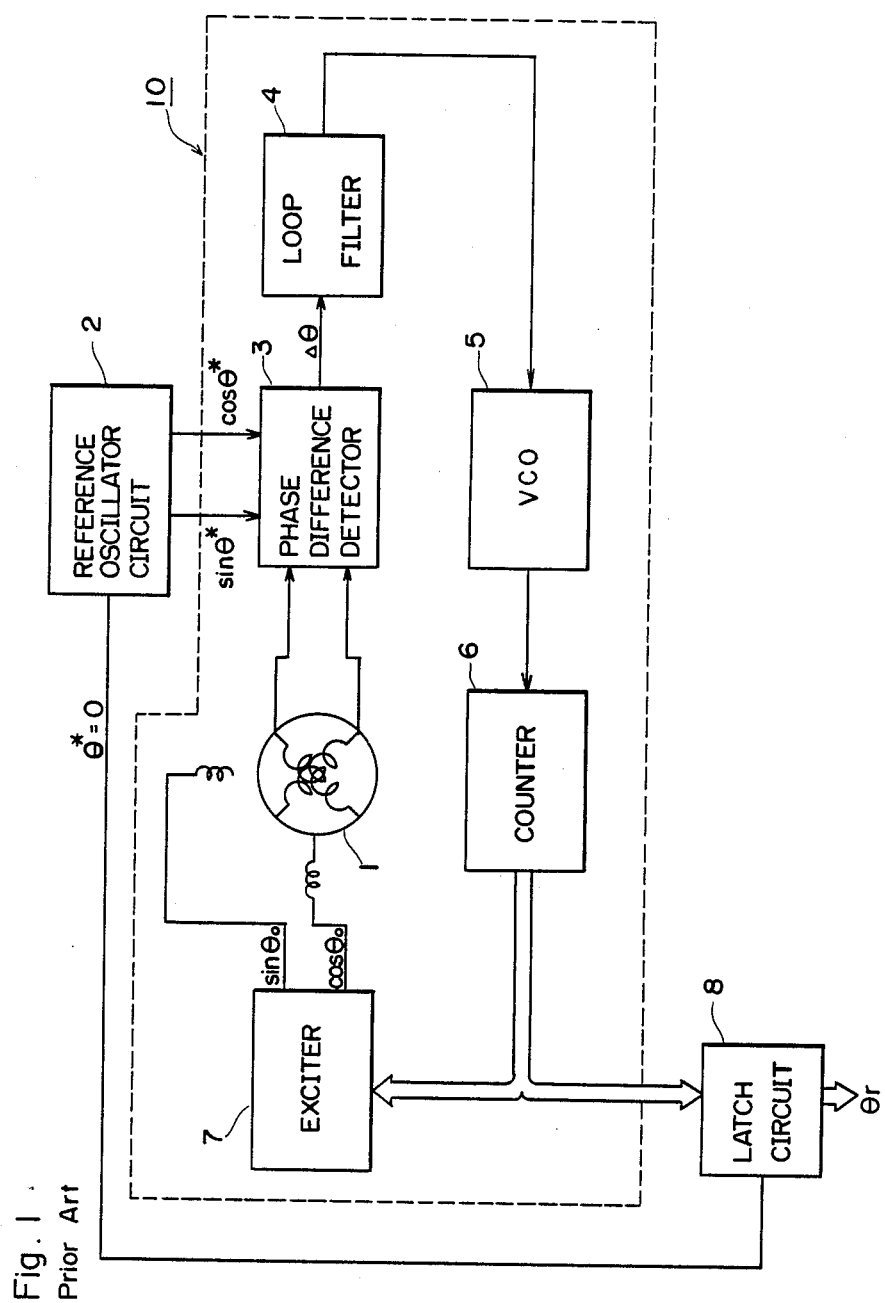
FIG. 1 is a block diagram of the conventional usual digital rotation detecting apparatus.

In addition, the same components as those shown in FIG. 1 of a conventional embodiment are designated by the same reference numerals.

Next, explanation will be given on operation of the digital rotation detecting apparatus of the invention. At first, the two-phase resolver 1 is excited by the two-phase alternate current of the fixed frequency from the exciter 17. When the phase of two-phase alternate current is represented by $\theta_o$ and a phase-angle of the two-phase resolver 1 by $\theta_r$, a two-phase AC signal having a phase of $\theta_o - \theta_r$ is outputted from the two-phase resolver 1 and fed to the phase difference detector 3. The VCO 5 oscillates by the frequency corresponding to the output voltage of the loop filter 4, the oscillation pulses by VCO 5 being counted by the counter 6. The two-phase signal generator 12 generates the two-phase AC signal of the phase angle in proportion to the counted value by the counter 6. The phase difference detector 3 detects a difference $\Delta\theta = (\theta_o - \theta_r) - \hat{\theta}$ between the phase $(\theta_o - \theta_r)$ of the two-phase output signal from the resolver 1 and that $\hat{\theta}$ of the output signal of the two-phase signal generator 12, the detected phase-difference signal being given to the loop filter 4. In FIG. 2, a portion surrounded by the broken line 20 constitutes a PLL (Phase Locked Loop), in which the loop filter 4, which carries out the proportional-plus-integral operation, is automatically controlled to always keep zero the phase angle $\Delta\theta$. Hence, the following equation is obtained:

$$\theta_r = \theta_o - \hat{\theta} \tag{4}$$

When the respective frequencies are represented by $f_o$, $f_r$ and $\hat{f}$, the following equation should be held:

$$f_r = f_o - \hat{f} \tag{5}$$

When the maximum counting number of the counter 6 is represented by N, the following equation is obtained:

$$N\left(\frac{\theta_r}{2\pi}\right) = \int Nf_r dt = \int (Nf_o - N\hat{f})dt \tag{6}$$

$N\hat{f}$ is equal to the oscillation frequency $f_{vco}$ of VCO 5, therefore, the following equation is obtained from the equation (6):

$$N\left(\frac{\theta_r}{2\pi}\right) = \int (Nf_o - f_{vco})dt \tag{7}$$

In order to obtain the value of the right side of the equation (7), the up-down counter 21 need only to be counted up by the clock of frequency $Nf_o$ and counted down by the clock of VCO 5.

The clock of frequency $Nf_o$ is obtained from the exciter 17. In detail, above-mentioned clock of frequency $Nf_o$ is obtained together with the exciting frequency $f_o$ from the exciter by constitution thereof including an oscillator of frequency $Nf_o$ and a 1/N frequency divider.

It is seen from the equation (7) that $\theta_r$ is able to be detected with accuracy of $1/N$. The detection delay depends on the cycle periods of $Nf_o$ and $N\hat{f}(=N(f_o - f_r))$, the cycle periods being extremely reducible by selecting N to be larger. In other words, although $f_o$ is generally several kilohertzes, $Nf_o$ can select even several tens megahertzes, whereby the detection delay is deemed to be zero in practical use and the phase angle $\theta_r$ at a desired time is detectable. Furthermore, there is no problem of the low frequency excitation because the two-phase resolver 1 is excited by fixed frequency.

In order to detect the rotational speed, a microprocessor need to sample the phase angle $\theta_r$ at a certain time interval $\Delta T$ and a difference between the two continuous sampling values need to be divided by $\Delta T$. In addition, in the first embodiment, the up-down counter 21 is not given the initial integrated value, whereby the absolute rotational phase angle obtained by deciding a specific rotational position to be $\theta_r = 0$ is not detected, which is not problematical because in the field of rotation control of the motor a rotation angle from a certain time point to the next is required.

Next, explanation will be given on a second embodiment of the invention.

Figure 3:
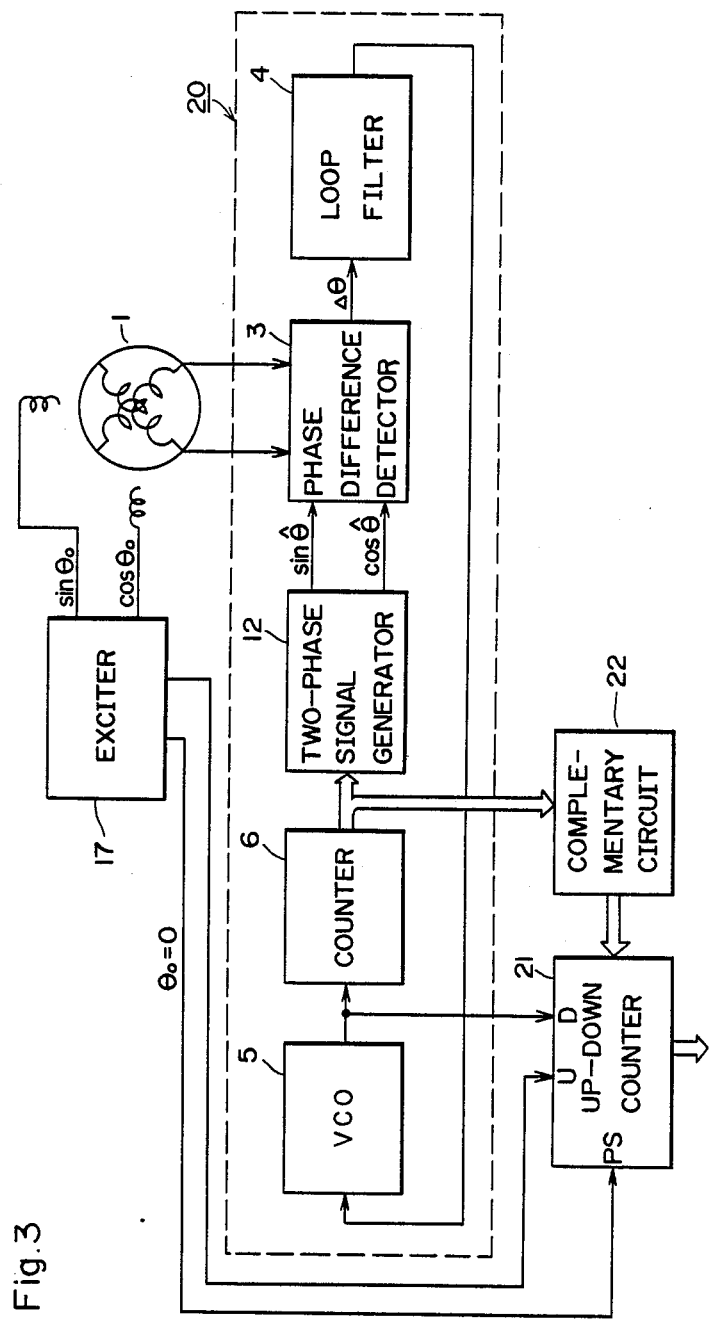

In FIG. 3 of a block diagram thereof, the counted value by the counter 6 at the first embodiment shown in FIG. 1 is given to an up-down counter 21 through a complementary circuit 22, so that the up-down counter 21 is adapted to preset a complement to the counted value of the counter 6 through a preset signal generated when the phase angle $\theta_o$ of the exciter 17 becomes zero. In other words, at the time of $\theta_o = 0$, $\theta_r = -\hat{\theta}$ is obtained. Meanwhile, since the counted value by counter 6 always indicates $$N\left(\frac{\hat{\theta}}{2\pi}\right),$$

the complement to the counted value by counter 6 is preset at the time of $\theta_o=0$ to thereby enable the up-down counter 21 to be given the initial integrated value.

Figure 4:
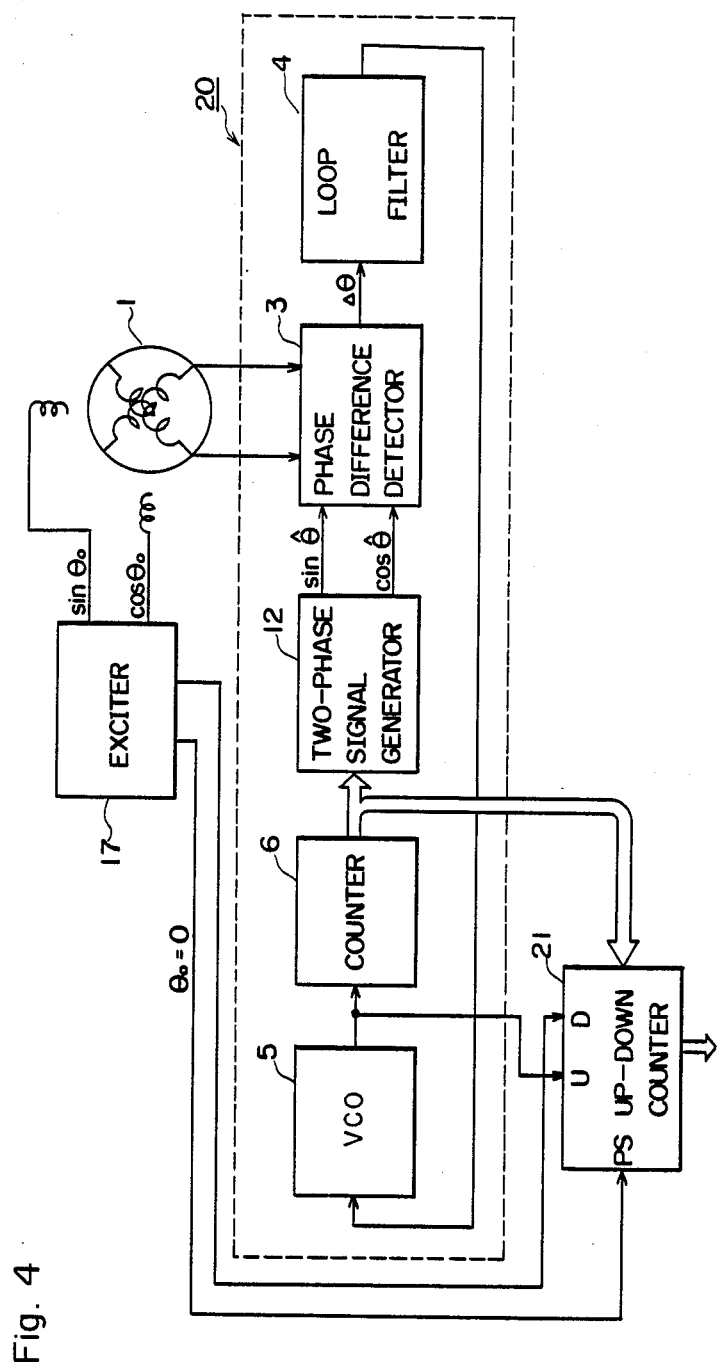

Accordingly, in the second embodiment, in addition to aforesaid characteristics of the first embodiment, the absolute rotational phase angle at the specific rotational position of $\theta_r=0$ of the resolver can be detected. Also, if an up signal and a down signal to be introduced into the up-down counter 21 are replaced with each other as shown in FIG. 4, the preset data of the second embodiment can be set without using the complementary circuit 22, where a phase angle $\theta_r$ signal detected at that time becomes the complement $(-\theta_r)$.

Figure 5:
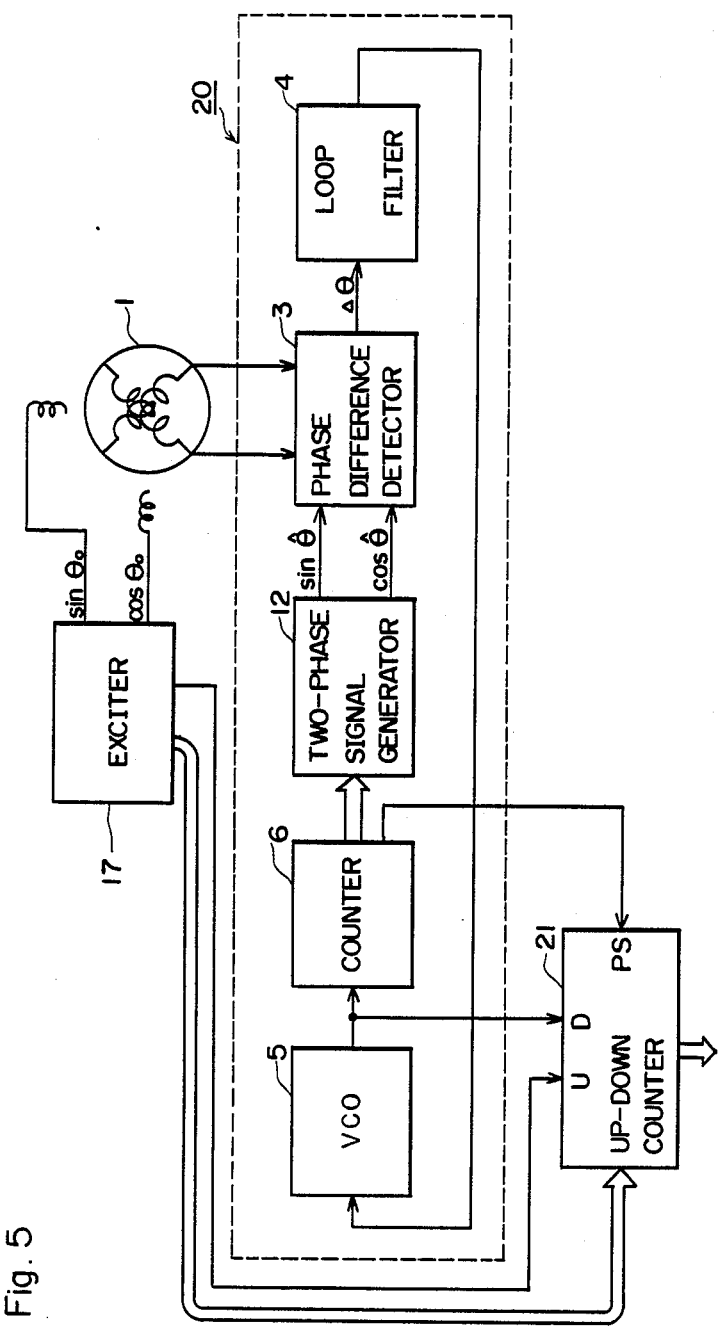

Furthermore, as seen from the equation (4), since $\theta_r=\theta_o$ is obtained at the time of $\hat{\theta}=0$, $\theta_o$ may be preset at the time of $\hat{\theta}=0$ as shown in FIG. 5. In this case, as described in the first embodiment shown in FIG. 2, the counted value of a frequency-dividing counter in the exciter 17 is usable as the preset data $\theta$.

Figure 6:
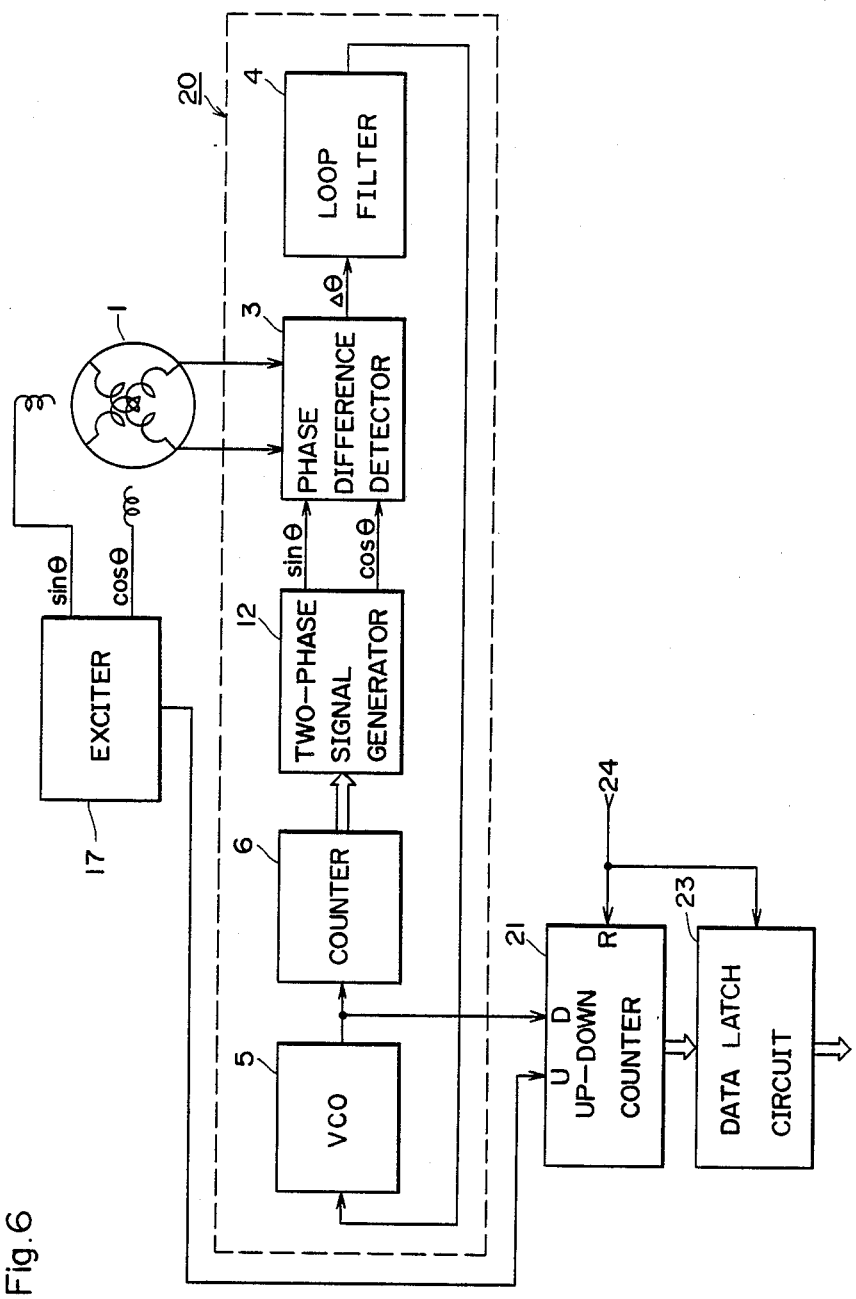

Next, in FIG. 6, a block diagram of a third embodiment of the invention is shown. The third embodiment is different from the first embodiment shown in FIG. 2 in that the counted value by an up-down counter 21 is adapted to be latched to a data latch circuit 23 by a unit cycle period pulse 24. The latch circuit 23 latches the counted value of the up-down counter 21 every time the unit pulse 24 is given, and just thereafter the up-down counter 21 is reset to start new counting. Hence, the value latched by the data latch circuit 23 at the time when the up-down counter 21 is reset, is a rotation angle by which the resolver 1 rotates for the unit time, in turn the rotational speed of the resolver 1. In other words, the value latched by the data latch circuit 23 is read out to thereby enable the rotational speed of the resolver 1 to be directly detected.

The third embodiment shown in FIG. 6, however, may be constructed to reset the up-down counter 21 in response to the unit period pulse 24 after the microprocessor reads in the counted value by the up-down counter 21. In this case, there is no need of using the data latch circuit 23.

Figure 7:
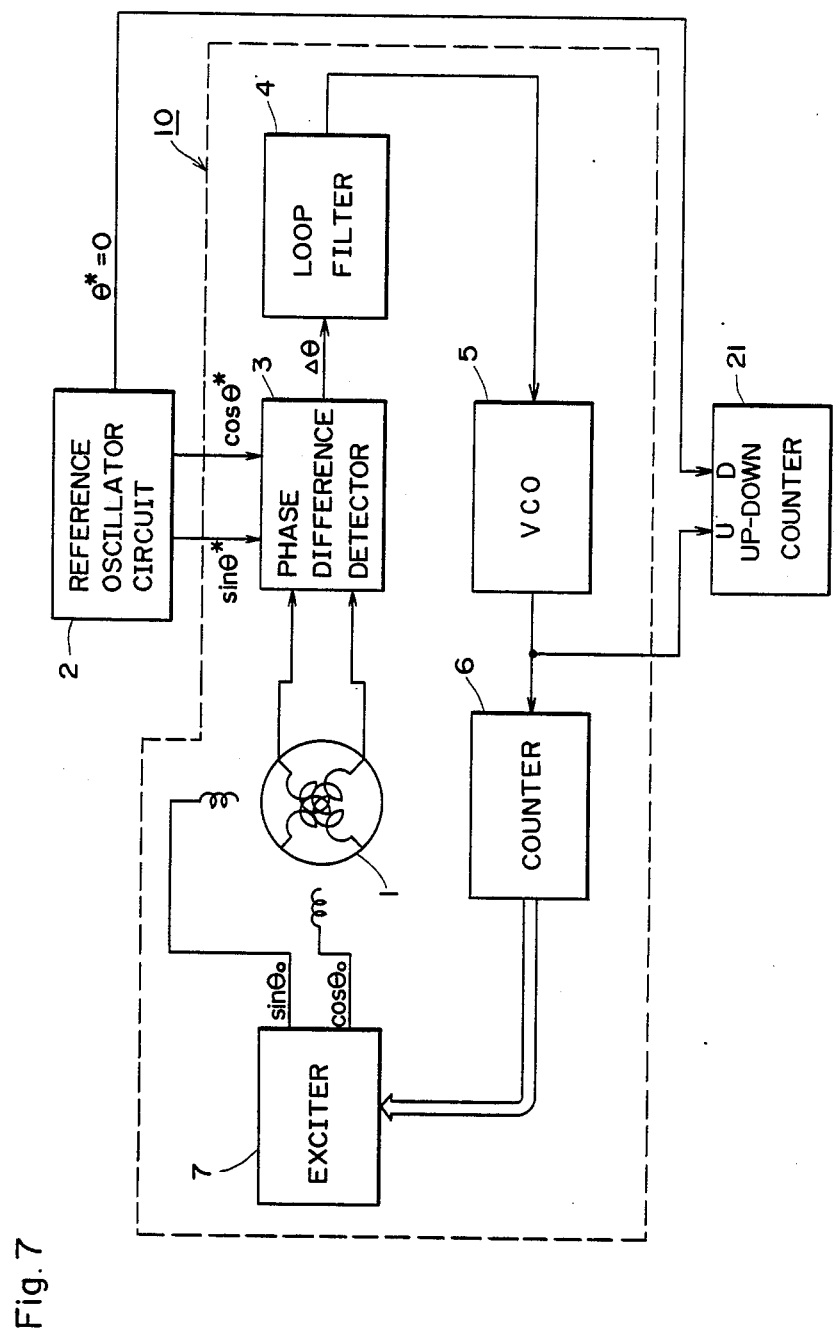

In addition, in comparison of the equation (2) with that (4), $\theta_o$ and $\theta_r$ are similar to each other and $\theta^*$ corresponds to $\hat{\theta}$, so that the detection of rotation angle by the up-down counter in the respective first, second and third embodiments, when the low frequency excitation is out of consideration, is also applicable to aforesaid conventional art as shown in FIG. 7.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A digital rotation detecting apparatus which excites a two-phase resolver by an exciter so as to synchronize phases of an output of said two-phase resolver and a predetermined signal, thereby detecting a rotation angle of said two-phase resolver, comprising:
   a two-phase signal generator;
   a phase difference detector which constitutes a phase locked loop together with said two-phase signal generator so as to detect a phase difference between the output of said two-phase resolver and that of said two-phase signal generator;
   a voltage control oscillator which constitutes said phase locked loop and outputs a frequency signal determined by the output of said phase-difference detector; and
   a first counting means which makes one of the output frequency of said voltage control oscillator and a frequency relating to the frequency of the output of said exciter an object of up count, and makes the other an object of down count, thereby detecting the rotation angle of said two-phase resolver.

2. A digital portion detecting apparatus as set forth in claim 1, wherein said phase locked loop comprises:
   a computing loop filter for proportional-plus-integrating the output of said phase difference detector;
   said voltage control oscillator which generates pulses of the frequency corresponding to the output of said computing loop filter;
   a second counting means for counting the output frequency of said voltage control oscillator; and
   said two-phase signal generator which generates a two-phase AC signal of the phase corresponding to the counted value by said second counting means;
   so that the counted value by said first counting means is made increasable or decreasable by the multiple frequency of the excitation frequency of said resolver and the output frequency of said voltage control oscillator, thereby detecting the number of rotations of said resolver.

3. A digital rotation detecting apparatus as set forth in claim 2, wherein the counted value by said second counting means is preset to said first counting means at the time when the phase of said exciter is zero.

4. A digital rotation detecting apparatus as set forth in claim 2, wherein the counted value indicating the phase of said exciter is preset to said first counting means at the time when the counted value by said second counting means is zero.

5. A digital rotation detecting apparatus which excites a two-phase resolver by an exciter so as to synchronize phases of an output of said two-phase resolver and a predetermined signal, thereby detecting a rotation angle of said two-phase resolver, comprising:
   a two-phase signal generator;
   a phase difference detector which constitutes a phase locked loop together with said two-phase signal generator so as to detect a phase difference between the output of said two-phase resolver and that of said two-phase signal generator;
   a voltage control oscillator which constitutes said phase locked loop and outputs a frequency signal determined by the output of said phase-difference detector;
   a first counting means which makes one of the output frequency of said voltage control oscillator and a frequency relating to the frequency of the output of said exciter an object of up count, and makes the other an object of down count, thereby detecting the rotation angle of said two-phase resolver; and a data latch circuit for latching the counted value by said first counting means;

whereby the counted value by said first counting means is latched periodically by said data latch circuit and said first counting means is reset so as to detect the rotational speed as the value latched by said data latch circuit.

6. A digital rotation detecting apparatus which excites a two-phase resolver by an exciter to control the frequency of said exciter so as to synchronize phases of output of said two-phase resolver and output of a two-phase reference oscillator, thereby detecting a rotation angle of said two-phase resolver, comprising:

a counting means which makes one of a frequency relating to the frequency of the output of said two-phase reference oscillator and a frequency relating to the frequency of the output of said exciter an object of up count, and makes the other an object of down count, thereby detecting the rotation angle of said two-phase resolver.

* * * * *